Oct. 9, 1951        J. C. COLUMBUS        2,571,015
COFFEE MAKER

Filed Oct. 10, 1946        3 Sheets-Sheet 2

Inventor:

John C. Columbus

Oct. 9, 1951 J. C. COLUMBUS 2,571,015
COFFEE MAKER
Filed Oct. 10, 1946 3 Sheets-Sheet 3

Inventor:
John C. Columbus

Patented Oct. 9, 1951

2,571,015

UNITED STATES PATENT OFFICE 2,571,015

COFFEE MAKER

John C. Columbus, Ferguson, Mo.

Application October 10, 1946, Serial No. 702,555

10 Claims. (Cl. 99—292)

This invention relates to devices of the pressure-vacuum type for making infusions of coffee, tea or the like, and more particularly to means for automatically venting such devices to cause the infusion to take place within a desired temperature range and to make possible the accomplishment of the infusing process within a comparatively short period of time.

This application is in part a continuation of an application filed by me on June 19, 1946, Serial No. 677,756, now abandoned.

In the light of tests made by the coffee industry and scientific institutions, the following requirements relating to infusing devices have been established for producing a coffee infusion of the highest quality:

(1) All parts of the infusing device coming in contact with the beverage should be of glass, porcelain, enamelware, or similar material which is chemically inert to coffee.

(2) The temperature of the water during infusion with the ground roasted coffee should be from 85° to 95° C.

(3) The infusion period should be brief, preferably 1 to 2 minutes.

(4) At the end of the infusion period the beverage should be quickly filtered from the grounds.

In the course of the heating of water in the lower container of conventional infusing devices of the pressure-vacuum type which are not vented, expanding entrapped air and evolved water vapor force a portion of said water up into the upper container of the device for infusion with the ground roasted coffee or the tea therein before its temperature is high enough to produce the most desirable and economical beverage.

In tests conducted with such a device of non-vented type and 40 fluid ounces capacity, the highest temperature attained by the water in the upper container thereof when the device was operated with 10 fluid ounces of water was 27° C., with 20 fluid ounces of water was 47° C., with 30 fluid ounces of water was 64° C., and with 40 fluid ounces of water was 80° C., the initial temperature of the water in each case being 22° C. Also, in these same tests, the lengths of time from the initial application of heat to the lower container of the device until the above-noted temperatures were attained, and the usual bubbling started, were approximately 40 seconds with 10 fluid ounces of water, 3 minutes with 20 fluid ounces of water, 6 minutes with 30 fluid ounces of water, and 10 minutes with 40 fluid ounces of water. In each case, the water began to rise into the upper container as soon as the heat was applied, and the time noted represents the approximate length of the infusion period exclusive of the time required for filtration. The source of heat was, in each case, of "medium" intensity as normally employed with such devices. The filtration time was found to range from approximately 3 minutes with the smaller quantity of water (low temperature and consequently low vacuum) to approximately 1 minute with the larger quantity of water (higher temperature and consequently higher vacuum).

It will be evident from these tests that, with the conventional non-vented coffee-making device, the most desirable infusion temperature is never attained and the infusion period also always exceeds the maximum value considered allowable.

The primary object of my invention is to provide, in a device of the pressure-vacuum type for making infusions of coffee, tea or the like, means which function automatically during the operation of said device whereby the infusion is accomplished within the correct temperature range with any reasonable quantity of water within the capacity of the device, and the infusion can also be accomplished within, or nearly within, the most desirable time limit.

Another object is to incorporate in a simple and economical manner such means for controlling the infusion temperature in a device for making infusions of coffee, tea or the like.

Other objects and advantages will either be pointed out or will be apparent from the drawings, description and discussion of the invention.

It has long been known in the art that the flow of water from the lower to the upper container of a pressure-vacuum type of coffee-making device can be delayed until said water has attained a predetermined temperature by providing a vent of proper size in the tubular portion of the upper container above the level of the water in the lower container. However, where the upper container is made of glass, which is desirable, it is very difficult to form a vent therein within the required size limits. On the other hand, the incorporation of a vent in the flexible connecting member normally employed to connect the upper and lower containers is extremely easy to accomplish since it can be formed therein as an integral part of the molding of the member. However, when the vent is incorporated in the flexible member of a device having a glass upper container with an integral tubular portion it must discharge into the atmosphere and therefore some means must also be provided for keeping the vent closed with respect to the atmosphere during the vacuum phase of operation of the device. My invention provides a vent in such a flexible connecting member and means for automatically controlling the communication of same with the atmosphere.

The essence of my invention may be stated as, in a device of the pressure-vacuum type for making infusions of coffee, tea or the like, having a flexible connecting member connecting the two containers thereof, the provision of a metering vent either in the flexible connecting member itself or formed by an indentation in said member in cooperation with the surface of one of said containers to permit gaseous matter to escape from the interior of the lower container thereof into the atmosphere during the pressure phase of operation of the device and thus modify the pressure existing in said lower container to the extent that liquid being heated therein is prevented from flowing up into the upper container proper until said liquid has attained a predetermined temperature, whereupon all of said liquid except a normal residual portion is then caused to flow up into said upper container proper, and the adaption of said flexible connecting member to function also, in cooperation with one of said containers, as a valve which is operated automatically by the difference in pressures within and without said lower container acting in opposition to the force of gravity during said pressure phase of operation to maintain, or to insure the maintenance of, the interior of said lower container in communication with the atmosphere through said vent and in cooperation with the force of gravity during the vacuum phase of said operation to effect an air-tight, or substantially air-tight, seal between the interior of said lower container and the atmosphere.

A preferred form of device incorporating my invention is illustrated in the accompanying drawings. In these drawings.

Figure 2:
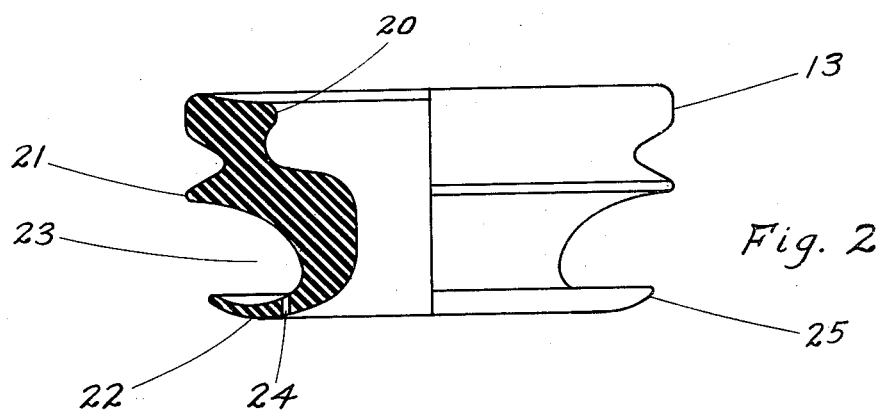
Figure 2 is a view, partly in vertical section, showing in detached relationship and undeformed the flexible connecting member of Figure 1.
Figure 4:
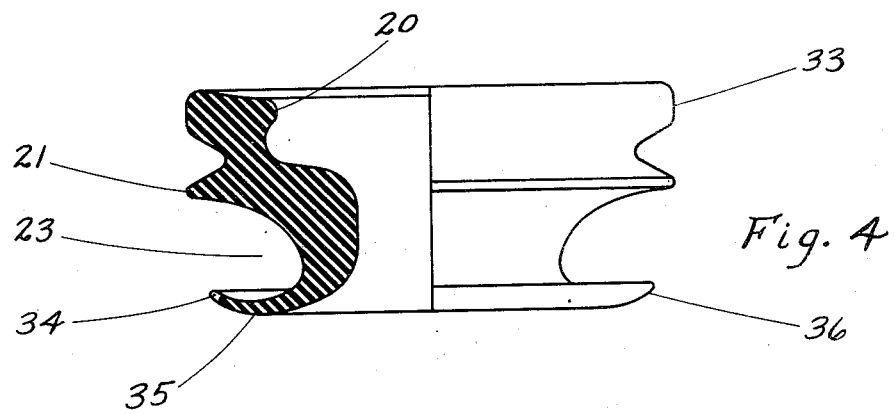
Figure 4 is a view, partly in vertical section, showing in detached relationship and undeformed a flexible connecting member similar to that shown in Figure 2 except that the vent is replaced by an indentation in the rim of the lower flange of same which, when said member is installed as in Figure 6, provides a vent.
Figures 3, 5:
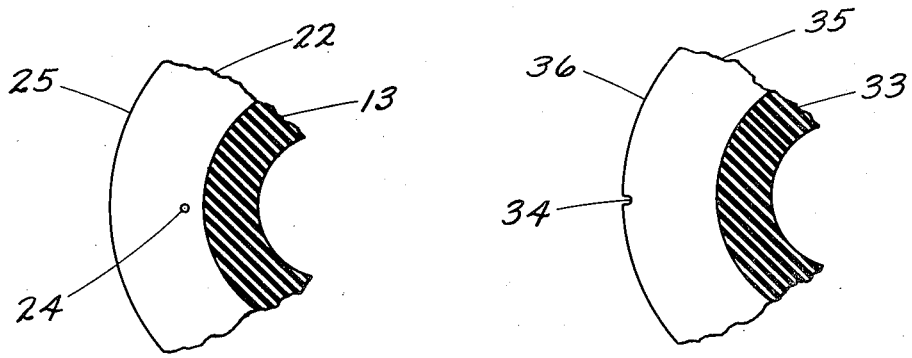
Figure 3 is a fragmentary horizontal section through the flexible connecting member of Figure 2 showing in plan view the vent in the lower flange of same.
Figure 6:
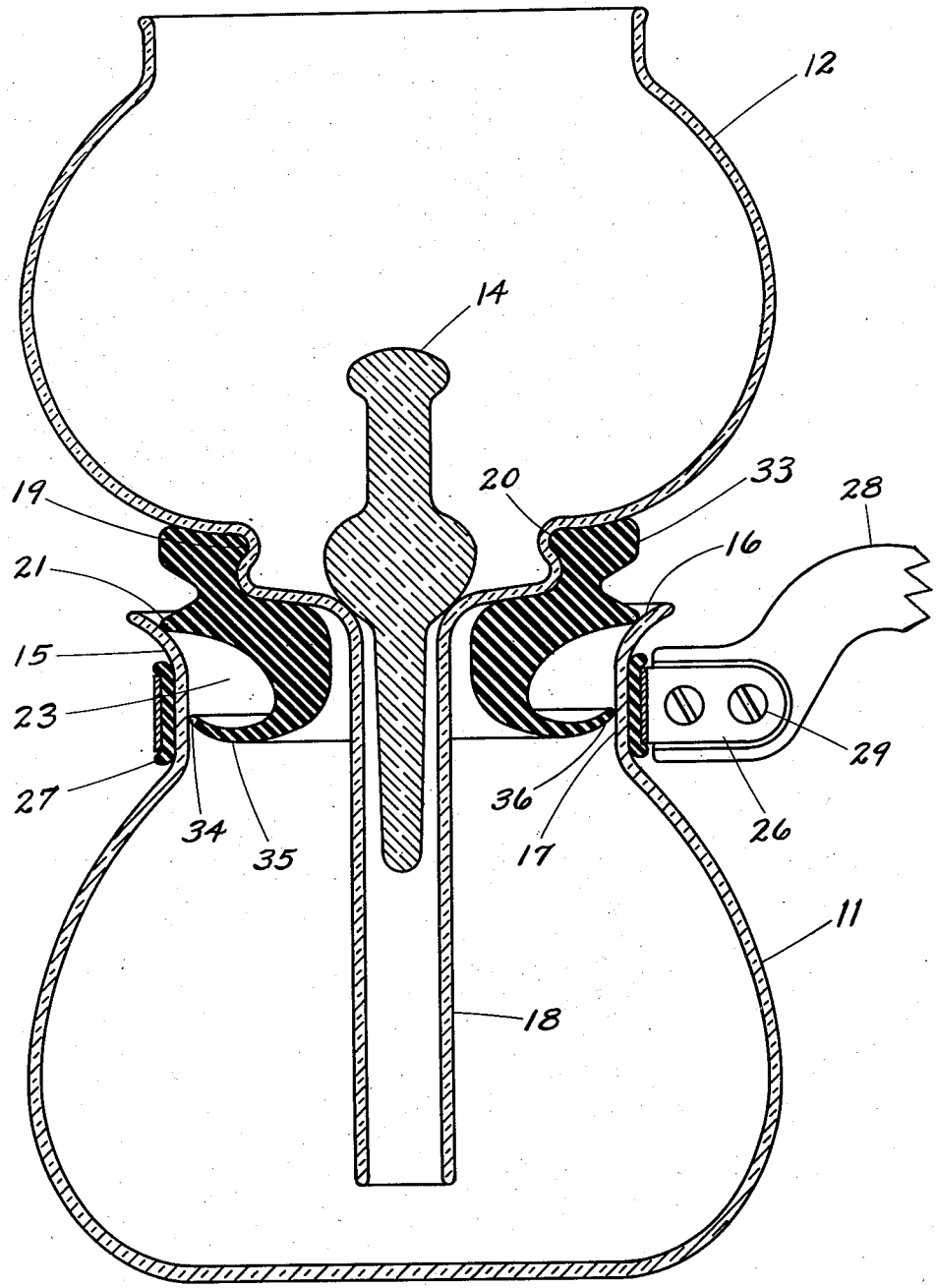

Figure 5 is a fragmentary horizontal section through the flexible connecting member of Figure 4 showing in plan view the indentation in the rim of the lower flange of same; and Figure 6 is a central vertical section of a device of the pressure-vacuum type for making infusions of coffee, tea or the like, incorporating the flexible connecting member shown in Figure 4 in place of the flexible member shown in Figure 2.

Figure 1:
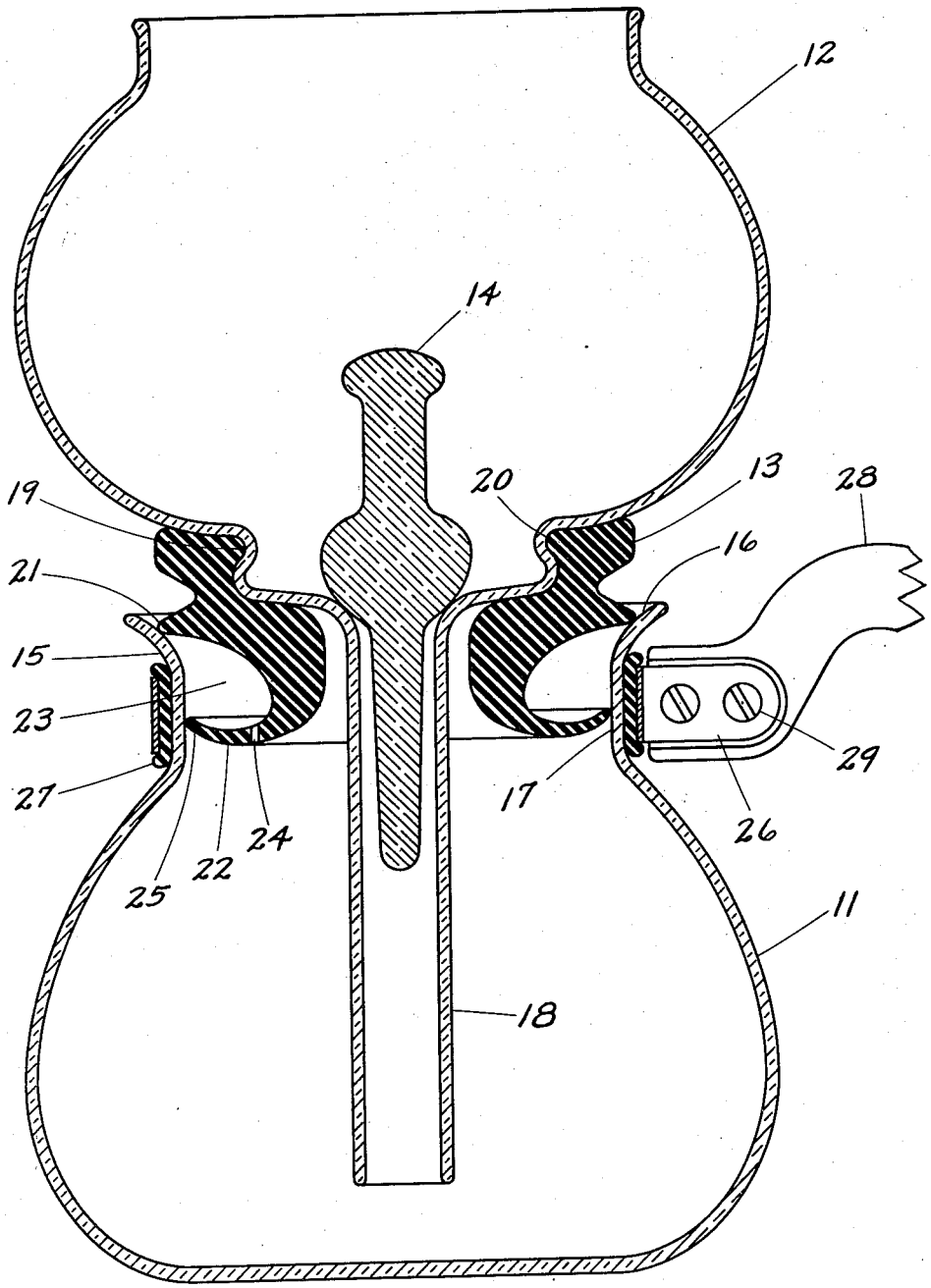
Figure 1 is a central vertical section of a device of the pressure-vacuum type for making infusions of coffee, tea or the like, incorporating my invention.

The device illustrated in Figures 1, 2 and 3, comprises essentially a lower container 11, an upper container 12, a flexible connecting member 13, and a filter unit 14. The upper and lower containers and the filter unit are preferably made of heat-resisting glass. The neck 15 of the lower container 11 is formed outwardly at its top to provide an upper flared portion 16 which merges into a substantially cylindrical lower portion 17. A metal band 26 surrounds the cylindrical portion 17 of the neck and is separated therefrom by a cushion strip 27 of resilient material such as cork or rubber. The ends of the metal band 26 are formed for attachment to a handle 28 by bolts 29. The upper container 12 incorporates in its bottom an integral tubular portion 18 which extends downward into the lower container 11 nearly to the bottom thereof. The filter unit 14 is of the imperforate gravity-seated type and rests in the upper container 12 as shown.

It should be understood, however, that any type of filter adaptable to the upper container may be employed. The flexible connecting member 13 is located between the upper and lower containers, 12 and 11, as shown in Figure 1, and, in addition to establishing the proper physical connection and relationship of the two containers, it functions automatically as a pressure-gravity operated valve for venting the lower container 11 directly to the atmosphere during the pressure phase of operation and isolating the interior of the lower container from the atmosphere during the vacuum phase of operation. The flexible connecting member 13 is preferably made of soft rubber and is adapted to surround but be spaced from the tubular portion 18 and to effect a physically secure and air-tight connection with the upper container 12 by means of the engagement of an internal annular rib 20 of the flexible connecting member with an external annular groove 19 in the bottom portion of the upper container proper. The exterior of the flexible connecting member 13 which cooperates with the neck 15 of the lower container is formed to provide annular upper valve and lower diaphragm sealing flanges, 21 and 22, with an annular space 23 therebetween, the lower flange having a small vent 24 through same. The upper valve flange 21 is of somewhat greater outside diameter than the inside diameter of the cylindrical portion 17 of the lower container neck so that it may seat in the flared portion 16 of said neck and thus serve to position the lower diaphragm flange 22 and the lower end of the tubular portion 18 correctly with respect to the lower container 11, to function as a pressure-gravity operated valve to permit escape of gaseous matter vented through the vent 24 during the pressure phase of operation, and to function as a seal in cooperation with said flared portion during the vacuum phase of operation.

The lower diaphragm flange 22 is essentially a diaphragm, preferably preformed as shown in Figure 2 to provide an up-turned rim 25 slightly larger in diameter than the inside diameter of the cylindrical portion 17 of the lower container neck, the upper surface of said flange being concave and the lower surface being convex. When the flexible connecting member is attached to the upper container 12 and installed in the neck 15 of the lower container, the rim 25 of the lower flange is flexed upward and compressed to a smaller diameter as shown in Figure 1. This installation may be accomplished with comparative ease since the deformation of the lower diaphragm flange 22, particularly at the rim, takes place largely in a lateral direction through the material and, due to the preformed upward slope of the outer portion of the flange, a comparatively small amount of deflection of the flange material at and near the rim is required to accommodate the rim 25 to the cylindrical portion 17. However, since some downward force is required to overcome the tendency of the rim 25 to adhere to the wall of the cylindrical portion 17 during installation, the remainder of the lower flange and the adjoining portion of the flexible connecting member are deformed slightly so that, upon discontinuing the installing pressure, the upper valve flange 21, which has been forced into contact with the flared portion 16 of the lower container neck, moves upward slightly due to the resilience of the material and is usually out of contact with the flared portion throughout a portion of its periphery and only lightly in contact therewith throughout the remainder of its periphery. When installed, a force considerably greater than that required for installation is required for removal of the flexible connecting member 13 from the neck 15, due to the fact that any force tending to remove the flexible connecting member also tends to straighten the curved outer portion of the lower diaphragm flange 22 and thus forces the rim 25 more tightly in contact with the cooperating cylindrical wall. Moreover, during the pressure phase of operation of the device, the gaseous pressure existing within the lower container 11 is uniformly applied over the lower convex surface of the lower diaphragm flange 22, tending to straighten same and thus augmenting the pressure of the rim 25 against the cooperating cylindrical wall.

In a device of the type illustrated, the maximum pressure in the lower container has been found to occur in the final stages of the pressure phase of operation during the transfer of water from the lower to the upper container, and usually ranges from 6 to 7 ounces per square inch for a device of 40 fluid ounces capacity. Therefore, in such a device, a pressure of approximately 8 ounces per square inch should be considered a minimum for design purposes. The lower diaphragm flange 22 must therefore be so designed that, when installed in the cylindrical portion 17 of the lower container neck, it will remain in place against an upwardly-acting pressure determined by multiplying the area in square inches defined by the diameter of the cylindrical portion by the minimum unit design pressure (in this case 8 ounces per square inch), less the weight of the flexible connecting member 13 and the upper container 12 and its contents. This weight normally is approximately 18 ounces for a 40 fluid ounce device, and therefore in such a device the lower flange will remain in place due to the weight alone where the diameter of the cylindrical portion is 1.75 inches or less. However, present commercial practice and standardizing trends dictate a considerably larger diameter, and in such cases the resistance to displacement of the lower flange is most practically attained by a force fit of same of the required degree in the cylindrical portion. In any case, it is desirable that the diameter of the cylindrical portion 17 be as small as practicable. On the other hand, it is desirable that the diameter of the upper valve flange 21 be quite large to insure its positive action as a valve during the pressure phase of operation of the device to permit the escape of vented gaseous matter from the interior of the lower container, as will be explained in detail hereafter. It is thus necessary from a practical standpoint to establish the respective diameters between the two extremes theoretically indicated, and then design the lower diaphragm flange 22 to provide the necessary resistance to displacement during the pressure phase of operation. It should be understood that the lower flange need not necessarily be of the preformed shape shown in Figure 2. For instance, a more or less flat lower flange which is deformed upward toward its rim when installed, or a preformed lower flange of inverted conical shape, may be employed. Any form of lower flange possessing diaphragm characteristics, serving upon installation to properly position the upper flange, and providing the necessary resistance to displacement, may be employed in the arrangement illustrated.

The purpose of the vent 24 in the lower diaphragm flange 22 is to regulate the escape of air, vapor and steam from the interior of the lower container 11 above water contained therein when same is heated, thereby preventing said water from flowing up into the upper container 12 above the level of the seat of the filter unit 14 until said water has attained a desired predetermined temperature and then causing all of said water, except a normal residual portion, to flow up into said upper container.

The determination of the required size of the vent 24 and the theoretically required diameter of the upper valve flange 21 is dependent upon principles most easily and clearly explained in connection with their manifestations during operation of the device. The details of the operation set forth hereafter are therefore interspersed with elucidation of these principles and the manner in which each enters into the design of the device.

Cold, warm or hot water of the desired amount within the working capacity of the device is placed in the lower container 11, the device assembled as shown in Figure 1, and the proper amount of ground roasted coffee dumped into the upper container 12. The device is then placed upon a source of heat and, as the temperature of the water in the lower container 11 rises, the air entrapped above same is also heated and therefore expands. As the heating of the water progresses, the rate of air expansion increases, vapor is evolved from the water at an increasing rate, and finally steam is evolved at a much greater rate. Thus, it may be seen that, as the heating of the water progresses, these gaseous products must escape at an increasing rate to prevent the development of positive pressure within the lower container 11 sufficient to force the water prematurely up into the upper container 12. The expanding air, and subsequently the evolved vapor and steam, tend first to escape through the vent 24 to equalize the pressure in the space 23, above the lower diaphragm flange 22, with the pressure existing below. Such internal pressures, however distributed, act upward against the flexible connecting member 13 and tend to overcome the weight of the flexible member and the attached upper container and its contents. This weight is insufficient to maintain an air-tight joint between the upper valve flange 21 and the flared portion 16 of the lower container neck against any appreciable positive pressure in the lower container 11, and the entrapped gaseous matter in the space 23 escapes into the atmosphere to relieve such pressure. This action, in turn, permits more entrapped gaseous matter to escape into the space 23 through the vent 24. The vent, however, offers increasing impedance, as explained hereafter, to the flow of gaseous matter through same as the volume and pressure of such gaseous matter increase, and thus maintains an increasing positive pressure in the lower container 11 as the temperature of the contained water rises; and the increasing internal pressure insures the escape of the vented gaseous matter past the upper flange 21.

According to the laws of fluid mechanics, the rate of escape of gaseous matter through the vent 24 varies substantially in proportion to the square root of the difference in pressures existing at any particular instant within the lower container 11 and the space 23. That is to say, the rate of flow of escaping air, vapor or steam through such a vent increases to approximately 1.4 times when a given pressure is doubled, and to approximately twice the rate at four times the pressure, and so on. Thus, at a given rate of expansion of air, or evolution of vapor or steam, and with a vent of given size, equilibrium will be established according to the governing law at a definite positive pressure difference. Therefore, by varying the size of the vent in a device such as described and of given capacity, the water in the lower container can be caused to flow up into the upper container at any desired temperature within the useable range up to and including the boiling point. Consequently, the ultimate initial temperature of all of the water forced up into the upper container can be established within a very narrow range which, moreover, is not greatly altered by variations in the quantity of the beverage being prepared at any one operation. So long as the same proportions of ground roasted coffee and water are maintained, infusions of substantially uniform strength and quality can be obtained within any reasonable fraction of the full capacity of the device. I have found a vent cross-section area of approximately .0016 square inch satisfactory to produce an initial temperature of approximately 85° to 95° C. of the water in the upper container of a device of the type illustrated of 40 fluid ounces capacity, the lower temperature being obtained with 10 fluid ounces of water and the higher temperature being obtained with 40 fluid ounces. The lower initial temperature of the smaller quantity of water in the upper container is due to the absorption by the upper container and its contents of a greater proportional amount of the total heat of the water.

As previously pointed out, the pressure tending to effect an air-tight joint between the upper flange 21 and the flared portion 16 of the lower container neck during the pressure phase of operation is due to the weight of the flexible connecting member 13 and the attached upper container 12 and its contents. Prior to the flow of any water up into the upper container proper, this weight, including the capacity requirement of ground roasted coffee, may be established at approximately 18 ounces for a device having a capacity of 40 fluid ounces. However, as also pointed out previously, the upper valve flange 21 springs back upward slightly from its seated position upon installation of the flexible connecting member 13. Due to this action coupled with the inaccuracies inherent in glassware as manufactured and slight deformations always present in the flexible connecting member 13 when installed on the upper container 12, the weight of the upper container and its contents is rarely if ever sufficient to effect an air-tight joint between the upper flange 21 and the flared portion 16 when no counteracting positive pressure exists in the lower container 11; and the tendency to effect such an air-tight joint during the pressure phase of operation is definitely overcome as positive pressure develops in the lower container and gradually counteracts the weight acting downward.

The pressure necessary in the lower container 11 to force water up into the upper container 12 is 1 ounce per square inch for each 1.73 inches difference in the water levels, and for the device shown in Figure 1 of 40 fluid ounces capacity the minimum pressure required when full to cause water to flow up past the level of the filter seat is approximately 1 ounce per square inch. It will be evident therefore that, to obtain theoretically positive operation of the flexible connecting member 13 in the manner previously described to open the vent 24 and prevent the flow of water up into the upper container 12 beyond the filter seat, the net area within the diameter of the upper flange 21 should be such that a pressure of 1 ounce per square inch or less will, when acting within same, produce a total pressure acting upward which equals or exceeds the total weight of the flexible connecting member 13 and the attached upper container 12 and its contents acting downward. For such a total weight of 18 ounces, the theoretical minimum net area required is 18 square inches which requires a minimum diameter of the upper valve flange 21 of 4.8 inches. In practice, however, due to the fact that the upper valve flange 21 normally rests lightly in its seat and does not effect an air-tight seal therewith, an upper flange diameter considerably less than the theoretically indicated value may be employed. In the device illustrated of 40 fluid ounces capacity, an upper flange diameter of 3.2 inches has been found to provide excellent operation. For this upper valve flange diameter the inside diameter of the cylindrical portion 17 of the lower container neck is made from 2.8 to 2.9 inches which, incidentally, is the nominal diameter of this portion of most conventional coffee makers of the pressure-vacuum type now on the market.

During the pressure phase of operation of the device, the upper valve flange 21 never rises very far out of contact with its seat and it may thus restrict and modify to some extent the operation of the vent 24. The governing law stated applies exactly only in the case of a free vent, and therefore it may be necessary to make the vent 24 slightly larger than the size indicated for free and unrestricted venting. The factors entering into the theoretical determination of the exact size of vent required in any given case are practically impossible to determine by computation, but may be easily determined by experiment. When the size of the vent 24 and the diameter of the upper valve flange 21 are properly established for the capacity and weight of the device in any given case, the positive pressure developed in the lower container 11 during the pressure phase of operation is sufficient to insure the existence of an escape passage between the upper flange 21 and the flared portion 16 before the pressure is sufficient to force water up above the level of the seat of the filter unit 14, and the vent 24 then functions to regulate the escape of gaseous matter from the lower container 11 and thus regulates the pressure therein so that the water being heated therein is prevented from flowing up into the upper container 12 past the seat of the filter unit until it has attained a predetermined temperature, whereupon the water then rises into the upper container above the filter seat and its weight is distributed over the bottom of said upper container, increasing by its weight the gravitational force acting downward and tending to effect an air-tight joint between the upper flange 21 and the flared portion 16. The vent 24 may thus become completely blocked beyond this stage, but this is to be desired rather than prevented. In any event, the action of the vent 24 prevents excessive loss of pressure from the lower container so that the infusion is easily maintained in the upper container 12 during the desired infusion period in the customary manner by the boiling residual water in the lower container 11, any excess pressure which is not relieved by the vent and the upper flange being relieved by steam bubbling up through the infusion in the upper container.

After a desired length of time, the device is removed from its source of heat. As the pressure in the lower container 11 subsides, the weight of the flexible connecting member 13 and the attached upper container 12 and its contents, acting downward, tends to hold the upper valve flange 21 in contact with the flared portion 16 of the lower container neck and is usually sufficient to make the joint substantially air-tight. The drop in pressure within the lower container 11 is quite rapid as the steam therein condenses and, even though an air-tight joint may not have been previously effected between the upper valve flange 21 and the flared portion 16, the tendency for the air above the lower flange 22 to flow downward through the vent 24 to relieve the partial vacuum below is limited by the small size of the vent and thus the pressure above the lower flange tends to remain for some time greater than the pressure below. As a result of this condition, the lower diaphragm flange 22 is sucked downward and, in turn, draws the upper valve flange 21 securely into contact with the flared portion 16 and effects an air-tight joint therebetween if same has not previously been established. Beyond this stage, the pressures above and below the lower diaphragm flange 22 eventually equalize through the vent 24 at a pressure substantially below atmospheric, and this suction is then applied at the upper valve flange 21 rather than at the lower diaphragm flange 22. The upper flange 21 is thus maintained in secure air-tight contact with the flared portion 16 during the major portion, if not all, of the vacuum phase of operation. The partial vacuum formed in the lower container 11 accomplishes the filtration, drawing the infusion rapidly from the upper container 12, through the filtering spaces formed between the filter unit 14 and its seat, and into the lower container 11. After the filtering action is completed, the upper container 12, containing the filter unit 14 and the coffee grounds, is, with the attached flexible connecting member 13, removed from the lower container 11. The beverage is normally dispensed from the lower container.

It will be noted that, in the device described, the initial period of the pressure phase of operation, during which the water heats in the lower container, is not a part of the infusion period, the infusion period beginning when the hot water is forced up into the upper container above the filter seat. Approximately 15 to 45 seconds are required to force all of the water (except the normal residual portion) up into the upper container. Upon removal of the device from its source of heat, approximately 15 to 30 seconds are required for the lower container and its contents to cool to the point where condensation of the steam takes place and, following this phase, approximately 20 to 75 seconds are normally required for actual filtration when pulverized coffee is employed. In comparison with the vacuum developed in a conventional non-vented coffee maker, the vacuum developed by the device described is more nearly uniform where the amount of water employed varies widely, being much higher with a small amount of water but slightly lower with the full capacity amount. This may be explained by the fact that, in all cases with the vented device, most of the air originally entrapped in the lower container is expelled through the vent during the pressure phase of operation and replaced by steam, but a more or less constant small amount of air normally remains in the annular space 23 between the vent 24 and the upper valve flange 21 and thus lowers to some extent the vacuum subsequently formed, particularly during the final phases of capacity operation where the space in the lower container below the vent is comparatively small and the annular space 23 is comparatively large with respect thereto. With the device described, a complete infusion cycle can be completed within a range of from 45 seconds to 2.5 minutes, the exact time required being determined by the quantity of beverage being made. The extreme time of 2.5 minutes required for the infusion cycle for the capacity amount of beverage is substantially equal to the ideal maximum time permissible. It is possible to reduce this extreme time somewhat by making the normal capacity of a given device smaller, or making the device larger for a given normal capacity. When making small quantities of a beverage, a desired total infusion time, if in excess of that actually required for a complete infusion cycle, is attained in the usual manner by letting the infusion bubble in the upper container for the desired additional time before removing the device from its source of heat. During the pressure phase of operation the device is smooth and quiet in action, with no tendency evident for the flexible connecting member to chatter in its seat. The vacuum phase of operation of the device is uniformly positive.

The operation of the device for making infusions of tea is the same as that employed for making infusions of coffee except that a longer infusion period, generally about 4 to 5 minutes, is employed.

It will be apparent to one skilled in the art that the vent may be incorporated in the device in any manner whereby it connects the space in the lower container 11 below the lower diaphragm flange 22 with the space 23 above said flange. In the form of flexible member illustrated in Figure 4 an indentation 34 is provided in the rim 36 of the lower flange 35 and, upon installation of the flexible connecting member 33 in place of flexible member 13 as illustrated in Figure 6, the vent is established by the cooperation of the indentation 34 with the adjacent wall of the lower cylindrical portion 17 of the lower container neck. The flexible connecting member 33 is otherwise the same as flexible member 13. The device illustrated in Figure 6 operates in the same manner as the device shown in Figure 1.

It will be understood that forms other than those illustrated may be devised without departing from the spirit of my invention, and the exclusive use of all such embodiments and modifications within the scope of the appended claims is contemplated. In particular, it is possible to devise flexible connecting members, or members with flexible flanges, which are quite different from those illustrated to accomplish the same purposes, and such arrangements, while being specific forms of my invention, are nevertheless considered as being contemplated generically by my incention as set forth herein.

In support of the generic claims contained herein, it may be stated that arrangements can be devised wherein:

(1) The vent is incorporated in the upper sealing flange and the lower sealing flange is adapted to provide the required valve action;

(2) The flexible connecting member cooperates with the upper container to provide the venting and valve action, an air-tight connection being maintained with the lower container; and (3) A sealing flange is provided, through or around which the venting takes place, which does not itself possess diaphragm characteristics, but which is flexibly connected to the body of the inter-container member.

I claim:

1. A beverage brewer comprising a container for air and a liquid to be heated and having a neck provided with a flared rim; a second container provided with an opening at one end thereof and a hollow stem on the other end extending into said container; a filter in said second container; a flexible member mounted on said second container for retaining air and vapor derived from said liquid in said container and having a vented diaphragm engaging the wall of the neck of said container; and a valve flange on said flexible member having a portion seatable on said flared rim and spaced from said diaphragm to form a chamber in said flexible member, one wall of said chamber being the neck of said container, some of the vapor from said liquid being heated and at least some of the air in said container escaping through said vent into said chamber and thence to atmosphere by lifting said valve from said flared rim for enabling the liquid to be heated to a predetermined temperature before being forced into said container, said valve preventing ingress of air into said container after it has been cooled for enabling atmospheric pressure to force liquid from said second container into said first mentioned container as the vapor in said second container condenses.

2. A beverage brewer comprising a container for air and a liquid to be heated and having a neck provided with a flared rim forming an opening for said container; a second container having an opening in one end thereof and a hollow stem on the other end extending into said container; a filter in said second container and a resilient member mounted on said second container about said stem; a vented diaphragm formed on said member whose periphery engages the wall of said neck; and a valve formed on said member supporting said second container and spaced from said diaphragm and seatable on said flared rim and forming a chamber with the wall of said neck and diaphragm, the vent in said diaphragm establishing communication between said container and said chamber, some of the vapor from said liquid being heated and some of the air in said container escaping into said chamber and to atmosphere by unseating said valve and enabling said liquid to be heated to a predetermined temperature before being forced into said second container, said valve being forced into engagement with said flared rim by atmospheric pressure as it forces the liquid in said second container through said filter into said first mentioned container as the vapor in said container condenses.

3. A beverage brewer of the pressure-vacuum type comprising a lower container having an opening in the top thereof; an outwardly flared rim about said opening forming an open neck for the lower container; an upper container having an opening in the top thereof; a tubular portion secured to said upper container and extending into said lower container through said neck; filtering means for said upper container; a flexible connecting member affixed in substantially air-tight relationship to said upper container about said tubular portion, the connecting member including a valve flange adapted to seat and rest on said flared rim; a vented diaphragm flange spaced from and below said valve flange and engaging the wall of said neck, said flanges and the intervening wall of said connecting member and said neck forming a chamber and the vent in said diaphragm flange connecting said chamber with the interior of said lower container whereby the escape of air and vapor from the interior of said lower container through said vent into said chamber and thence past said valve flange to the atmosphere, will be regulated by the vent and will occur during the pressure phase of operation of said brewer and, during the vacuum phase of operation of said brewer, will prevent entrance of air into said lower container.

4. A beverage brewer of the pressure-vacuum type comprising a lower container having an opening in the top thereof; a cylindrical member disposed about said opening forming an open neck for the lower container; an outwardly flared rim secured to the cylindrical member; an upper container having an opening in the top thereof; a tubular portion secured to said upper container which extends downwardly into said lower container through said neck; filtering means for said upper container and a flexible connecting member affixed in substantially air-tight relationship to said upper container about said tubular portion, said connecting member including an annular valve flange adapted to seat on said outwardly flared rim and resting thereon; a vented diaphragm flange spaced from and below said valve flange and engaging the inner wall of said cylindrical member, said flanges and the walls of said connecting member and said cylindrical member forming a chamber, the vent in said diaphragm flange connecting said chamber with the interior of said lower container whereby the escape of air and vapor from the interior of said lower container through said vent into said chamber being regulated by the vent and the valve flange, will occur during the pressure phase of operation of said brewer and, during the vacuum phase of operation of said brewer, will prevent entrance of air into said lower container.

5. A beverage brewer as defined in claim 4 in which said diaphragm flange has an up-turned outer rim engaging the inner wall of said cylindrical member.

6. A beverage brewer of the pressure-vacuum type comprising a lower container having an opening in one end thereof; means disposed about said opening forming a neck and an annular seat for a valve; an upper container having an opening in the top thereof; a tubular portion secured to the upper container and extending into said lower container through said neck; means associated with said upper container for filtering liquid therefrom; an annular connecting member affixed substantially air-tight to said upper container about said tubular portion, said connecting member comprising a flexible flange adapted to cooperate with said annular valve seat by resting thereon; a flexible diaphragm flange spaced from said flexible flange and in annular and substantially air-tight engagement with a portion of said neck, said flanges and the walls of said connecting member and said neck forming a chamber, said flexible diaphragm having a vent therein connecting said chamber with the space in said lower container whereby the escape of air and vapor from the interior of said lower container through said vent and said chamber and past said flexible flange to the atmosphere, will be regulated during the pressure phase of operation of said brewer and, during the vacuum phase of operation of said brewer, the flexible flange will prevent entrance of air into said lower container.

7. A beverage brewer of the pressure-vacuum type comprising a lower container having an opening in the top thereof; means for forming an open neck on said lower container; an outwardly flared rim on said means; an upper container having an opening in the top thereof; a hollow stem secured to the upper container and extending into said lower container through said neck; means associated with said upper container for filtering liquid therefrom; a connecting member affixed in substantially air-tight relationship with said upper container about said tubular portion, the connecting member including a flexible valve flange adapted to seat on said flared rim; a flexible diaphragm flange having a vent therein and spaced from and below said valve flange and disposed in said means in substantially air-tight engagement therewith, said flanges and the walls of said connecting member and said means forming a chamber, the vent connecting said chamber with the interior of said lower container whereby the escape of air and vapor from the interior of said lower container into said chamber and thence past said flexible valve flange to atmosphere, is regulated during the pressure phase operation of said brewer and, during the vacuum phase of operation of said brewer said flexible valve flange will prevent the entrance of air into said lower container.

8. A beverage brewer of the pressure-vacuum type comprising a lower container having an opening in the top thereof; a tubular portion forming an open neck about said opening; an outwardly flared rim on said tubular portion; an upper container having an opening in the top thereof; a tubular portion secured to said container opposite said upper container opening which extends into said lower container through said neck; filtering means in said upper container; a connecting member affixed in substantially air-tight relationship with said upper container about said tubular portion, said connecting member including a valve adapted to seat on said outwardly flared rim; a vented diaphragm flange spaced from and below said valve and disposed about said tubular portion in substantially air-tight engagement with the interior surface thereof, said diaphragm flange and the walls of said connecting member and said neck forming a chamber, the vent connecting said chamber with the interior of said lower container whereby the escape of air and vapor from the interior of said lower container through said vent into said chamber is regulated, the vapor and air thus escaping to atmosphere during the pressure phase of operation of said brewer and, during the vacuum phase of operation of said brewer, the diaphragm flange will prevent entrance of air into said lower container.

9. A beverage brewer of the pressure-vacuum type comprising a lower container having at the top thereof an open neck which includes an outwardly flared rim and a cylindrical portion below said rim, an open top upper container having at the bottom thereof a tubular portion extending downwardly into said lower container through said neck, means associated with said upper container for filtering liquid therefrom, a connecting member affixed in substantially air-tight relationship to said upper container about said tubular portion, said member comprising a flexible valve flange adapted to seat on said outwardly flared rim and resting thereon, a flexible diaphragm flange spaced from and below said valve flange and disposed in said neck in substantially air-tight relationship with said cylindrical portion, said flanges and the intervening walls of said member and said neck forming a chamber therebetween, said member having a vent therein connecting said chamber with the interior of said lower container, whereby the escape of air and vapor from the interior of said lower container through said vent into said chamber and past said valve flange to the atmosphere is regulated and will occur during the pressure phase of operation of said brewer, air being prevented from entering into said lower container past said valve flange during the vacuum phase of operation of said brewer.

10. A beverage brewer of the pressure-vacuum type comprising a lower container having at the top thereof an open neck provided with a seat for a valve flange, an open top upper container having at the bottom thereof a tubular portion extending downwardly into said lower container through said neck, means associated with said upper container for filtering liquid therefrom, a connecting member affixed substantially air-tight to said upper container about said tubular portion, said member comprising a flexible valve flange adapted to cooperate with said seat and resting thereon, a flexible diaphragm flange spaced from said valve flange and engaging said neck about the opening therein in substantially air-tight relationship, said flange and the intervening walls of said member and said neck forming a chamber therebetween, said member having a vent therein connecting said chamber with the space existing on the opposite face of said diaphragm flange, whereby the escape of air and vapor from the interior of the lower container through said vent and said chamber past said valve flange to the atmosphere is regulated and will occur during the pressure phase of operation of said brewer, air being prevented from entering into said lower container past said valve flange during the vacuum phase of operation of said brewer.

JOHN C. COLUMBUS.

REFERENCES CITED

The following references are of record in the file of this patent:

UNITED STATES PATENTS

| Number | Name | Date |
|---|---|---|
| 1,327,519 | Bitter | Jan. 6, 1920 |
| 1,494,691 | Loggie et al. | May 20, 1924 |
| 2,115,035 | Morgan | Apr. 26, 1938 |
| 2,133,178 | Sieling | Oct. 11, 1938 |
| 2,174,466 | Kell et al. | Sept. 26, 1939 |
| 2,186,888 | Tullar et al. | Jan. 9, 1940 |
| 2,314,386 | Brend | Mar. 23, 1943 |
| 2,321,411 | Morse | June 8, 1943 |

FOREIGN PATENTS

| Number | Country | Date |
|---|---|---|
| 503,056 | Germany | July 19, 1930 |